(12) United States Patent
Giacalone (10) Patent No.: US 7,703,822 B1
(45) Date of Patent: Apr. 27, 2010

(54) COMBINATION RAKE AND SHOVEL TOOL

(76) Inventor: Arthur Giacalone, 5 Heritage Ct., Lake Ronkonkoma, NY (US) 11779

( * ) Notice: Subject to any disclaimer, the term of this patent is extended or adjusted under 35 U.S.C. 154(b) by 0 days.

(21) Appl. No.: 11/692,598

(22) Filed: Mar. 28, 2007

(51) Int. Cl.
*A01D 7/10* (2006.01)
*A01B 1/20* (2006.01)

(52) U.S. Cl. .................... 294/51; 294/50.8; 56/400.12; 56/400.16

(58) Field of Classification Search .................. 294/51, 294/50.8; 56/400.04, 400.07, 400.12, 400.16
See application file for complete search history.

(56) References Cited

U.S. PATENT DOCUMENTS

| | | | |
|---|---|---|---|
| 125,480 A | 4/1872 | Newman | |
| 407,465 A * | 7/1889 | Brick | 294/50.8 |
| 659,518 A | 10/1900 | Estlack | |
| 1,588,927 A | 6/1926 | Willis | |
| 2,908,131 A | 10/1959 | Ross | |
| 3,688,484 A | 9/1972 | Cox | |
| 4,991,386 A | 2/1991 | Dirksen | |
| 5,459,988 A | 10/1995 | Glaser | |
| 5,564,266 A | 10/1996 | Laughlin | |
| 5,564,267 A | 10/1996 | Bricker et al. | |
| D384,865 S * | 10/1997 | Baran | 294/50.8 |
| 5,881,545 A * | 3/1999 | Wilson | 294/50.9 |
| 6,120,073 A | 9/2000 | Jones | |
| D506,112 S * | 6/2005 | Roberson et al. | D8/13 |
| 6,904,743 B2 | 6/2005 | Vodinh | |
| 7,131,255 B1 | 11/2006 | Caneba | |
| 7,168,230 B1 * | 1/2007 | Waddell | 56/400.12 |

FOREIGN PATENT DOCUMENTS

| | | |
|---|---|---|
| AU | 2003100904 | 10/2003 |
| GB | 401 | 0/1901 |
| GB | 2.358.781 | 8/2001 |
| WO | WO96/35322 | 11/1996 |

* cited by examiner

*Primary Examiner*—Paul T Chin
(74) *Attorney, Agent, or Firm*—Michael I Kroll (57) ABSTRACT

A combination rake and shovel tool having handles of which are crossed and pivoted to one another. The rake having a straight head and prongs pointing in the direction of the shovel scoop and being a leaf type rake. The shovel is similar to a snow shovel. The rake and shovel close together to pick up leaves and debris. The device may also be singularly used as a shovel or rake or in combination, additionally the present invention can be placed in a standing position when not in use.

7 Claims, 13 Drawing Sheets

COMBINATION RAKE AND SHOVEL TOOL

BACKGROUND OF THE INVENTION

1. Field of the Invention

The present invention relates generally to hand tools and, more specifically, to a combination rake and shovel tool having handles of which are crossed and pivoted to one another. The rake having a straight head and prongs pointing in the direction of the shovel scoop and being a leaf type rake. The shovel is similar to a snow shovel. The rake and shovel close together to pick up leaves and debris. The device may also be singularly used as a shovel or rake or in combination. Additionally the present invention can be placed in a standing position when not in use.

2. Description of the Prior Art

There are other hand tools designed for yard work. Typical of these is U.S. Pat. No. 125,480 issued to Newman on Apr. 9, 1872.

Another patent was issued to Estlack on Oct. 9, 1900 as U.S. Pat. No. 659,518. Yet another U.S. Pat. No. 1,588,927 was issued to Willis on Jun. 15, 1926 and still yet another was issued on Oct. 13, 1959 to Ross as U.S. Pat. No. 2,908,131.

Another patent was issued to Cox on Sep. 5, 1972 as U.S. Pat. No. 3,688,484. Yet another U.S. Pat. No. 4,991,386 was issued to Dirksen on Feb. 12, 1991. Another was issued to Glaser on Oct. 24, 1995 as U.S. Pat. No. 5,459,988 and still yet another was issued on Oct. 15, 1996 to Laughlin as U.S. Pat. No. 5,564,266.

Another patent was issued to Bricker, et al. on Oct. 15, 1996 as U.S. Pat. No. 5,564,267. Yet another U.S. Pat. No. 6,120,073 was issued to Jones on Sep. 19, 2000. Another was issued to Vodinh on Jun. 14, 2005 as U.S. Pat. No. 6,904,743 and still yet another was issued on Nov. 7, 2006 to Caneba as U.S. Pat. No. 7,131,255.

Another patent was issued to Klingler on Feb. 23, 1901 as U.K. Patent No. GB407. Yet another International Patent Application No. WO 96/35322 was issued to Jysky on Nov. 14, 1996. Another was issued to Hsu on Aug. 8, 2001 as U.K. Patent No. GB2358781 and still yet another was issued on Dec. 18, 2003 to Pineyro, et al. as Australia Patent No. AU 2003100904.

U.S. Pat. No. 125,480

Inventor: Thomas G. Newman

Issued: Apr. 9, 1872

This invention relates to a new and useful improvement in an implement for handling live or other coals, brands of fire, and other articles, designed to be used as a substitute for the separate shovel and tongs in common use; and it consists in a shovel-blade on a slotted handle, and in a wire brush or rake on the end of a handle, which works in the slot of the shovel-handle; the construction and arrangement of parts being as hereinafter more fully described.

U.S. Pat. No. 659,518

Inventor: Thomas Estlack

Issued: Oct. 9, 1900

In an implement for the purposes described, the combination with the pivoted tong members, the upper ends of which terminate in handle portions and whose lower ends terminate in sockets, of a pair of jaw members one for each tong or bar, said jaw members each having means whereby they are detachably secured to the socketed ends of the tongs, the lower ends of the said jaws being flat and terminating in claws, the claw portion of one jaw being extended below the claw portion of the other jaw, whereby the claw portion of the said other jaw will close upon the flat part of the opposing jaw, substantially as shown and described.

U.S. Pat. No. 1,588,927

Inventor: Luke A. Willis

Issued: Jun. 15, 1926

Means for connecting a pair of implement handles together, wherein said handles are arranged in side-by-side crossed relation and are detachably connected at their outer ends with a pair of duplicate toothed heads disposed in opposed relation, said means comprising a pair of duplicate castings each including a wear compensating disc and an elongated channel, the discs being disposed in movable contact and the channels being arranged for reception of the handles, and a bolt passing through the handles and castings, said bolt being provided with a retaining nut.

U.S. Pat. No. 2,908,131

Inventor: Lofton B. Ross

Issued: Oct. 13, 1959

A combination garden implement comprising: a pair of elongated handles crossed and pivotally connected at one end and extending, when in a closed position, in close parallelism with each other, metallic bars of substantially U-shaped transverse section affixed transversely on the pivotally connected end portions of the handles, plates of resilient metal secured in said bars, and resilient fingers integral with said plates and depending therefrom, the fingers of the respective plates being relatively staggered and including oppositely angularly bent interleaving free end portions providing a reversible rake when the handles parallel each other, said handles, when in parallelism, forming a single handle for said reversible rake.

U.S. Pat. No. 3,688,484

Inventor: Eugene O. Cox

Issued: Sep. 5, 1972

A first rake head is fixed to an elongate handle and combined with a second rake head and handle by a pivot pin connecting the handles at a central point such that the rake tines may be brought together in opposite hand orientation to lift gathered material to a receptacle. Preferably the pivot pin connects the rake handles at a flatted area on each handle to provide free motion of the rake heads to and from each other. The flatted portion of each handle may be separable from the shank of the rake handle extending from the tines.

U.S. Pat. No. 4,991,386

Inventor: Ole A. Dirksen

Issued: Feb. 12, 1991

A pair of rakes are pivotally interconnected to gather and transport leaf material. Blades are provided on the lower ends of the rakes which are identical in shape but facing in opposite directions. Sleeves for the handles are offset from the vertical centerline of the blades allowing for the adjacent blade ends to be coplanar. The teeth may abut against each other at their lower ends in the closed position or intermesh in registering relationship.

U.S. Pat. No. 5,459,988

Inventor: Henry A. Glaser

Issued: Oct. 24, 1995

A quick connect rake system preferably comprising two rakes or similar yard tools pivoted together by a quick-connect tube system. The tube attaches to the handle of one rake and pivotally couples the handle of a second rake. The tube has a follower slot extending along one of its sides and a hole on the opposite side. The follower slot has an admission orifice at one end to receive the head of a conventional screw to attach the tube to the rake. The remainder of the slot captivates the head of a screw attached to a second rake. The captivation of the screw head pivotally couples the two rakes. The hole in the tube facilitates the permanent attachment of the tube to the rake.

U.S. Pat. No. 5,564,266

Inventor: Kencil H. Laughlin

Issued: Oct. 15, 1996

Grass rake tongs consist of a pair of rakes each having an array of tines joined to a handle by a ferrule and means such as a pin or bolt disposed through the handles above the ferrules at a point approximately mid-way between the lower end of the tines and the upper end of the handles pivotally connecting the handles for rotation with inside portions of said arrays of tines opposing each other. Preferably, rotation about the pivot extends approximately 180.degree. from a fully opened condition in which the handle of each rake abuts an outer portion of the array of tines of the other rake to a fully closed condition in which an inner surface of each array of tines abuts an inner surface of the other array of tines.

U.S. Pat. No. 5,564,267

Inventor: James A. Bricker et al.

Issued: Oct. 15, 1996

A tool formed by a pivotal connection between a first shaft and a second shaft. One shaft has a scooping head such as a shovel or a rake head. The other shaft has a rake head with a plurality of tines having bent distal end portions extending out in a direction away from the scooping head. The rake head may further include flanged portions extending from the distal end of the rake head in a direction toward the scooping head. The pivotal connection may be designed so that it is detachable; and, if so, detachment may be limited to when the shafts are separated in a maximum full open position. The combination tool may be used for raking and picking up leaves or other debris.

U.S. Pat. No. 6,120,073

Inventor: George William Jones

Issued: Sep. 19, 2000

A device for gathering and lifting leaves that utilizes a specially designed pair of leaf scoops that are pivotally secured to each other in opposing orientation via their handles. Each of the leaf scoops is provided with a separate pivotal axis that extends through the handle of the leaf scoop. The leaf scoops are offset from each other so that the handles can be operated like the handles of a pair of scissors in order to open and close the heads of the leaf scoops relative to each other, thereby capturing leaves between the scoop heads so the leaves can be transported and so the leaves can be released when the leaves have been transported to the desired location. The device is provided with a central handle that attaches midway between the pivotal axes so that the user can grasp the central handle when lifting the device and the leaves.

U.S. Pat. No. 6,904,743

Inventor: Hein Vodinh

Issued: Jun. 14, 2005

A device for combining two rakes to provide a combination raking and picking up apparatus comprises a pair of sleeves pivotally attached to one another. A first rake handle is secured into the first of the connected sleeves. A third sleeve is separately attached to a second rake handle. The third sleeve and rake handle fit into the second sleeve. The attachment of the second sleeve to the third sleeve allows the second rake to rotate at least 180 degrees within the second sleeve. This allows a user to use the apparatus for raking lawn debris and to easily convert the apparatus to enable the user to pick up debris as well.

U.S. Pat. No. 7,131,255

Inventor: Mary Ann Caneba

Issued: Nov. 7, 2006

A household tool for gathering and picking material comprising two rake head and handle units arranged side by side, overlapping, or crisscrossed with both rake heads arranged in substantially the same orientation. The units are temporarily held in this position by several possible fasteners along the length of the units. One version allows both units to be completely disconnected when in the pick-up mode. Another version is additionally joined quasi-permanently at a pivoting joint that allows the units to swing in opposite directions when their undersides are substantially facing each other. One or both of the handles can be extended for raking and retracted for picking. Each unit has a fixed or adjustable hand grip or arm grip for less fatigue when picking. The rake head may partly overlap to provide more picking-up capacity and more stability to the components.

U.K. Patent Number GB401

Inventor: Matthaus Klingler

Issued: Feb. 23, 1901

Disclosed is a combination tool or appliance capable of being used as a furnace rake or fire tongs or for other gripping purposes, preferably formed of one piece of strip iron, steel, or the like, consisting of two gripping arms connected to form a compressible spring handle, and which are held together in front of the handle by a fastener, and the free ends of which arms are shaped as a furnace rake, which when not in use lie close together, and are opened by compressing the handle, whilst the object gripped is automatically held fast on the release of the handle in consequence of the spring action of the handle, substantially as hereinbefore described and shown.

International Patent Application Number WO96/35322

Inventor: Goran Gysky

Issued: Nov. 14, 1996

A combined rake and pick-up device comprising a handle (1) and a rake head (2) attached to the bottom end of the handle. The rake head (2) includes resilient tines (4) whose free ends are angled to form prongs (5). The device also includes a press head (9) which can be swung relative to the rake head (32) so as to firmly grip raked material (13) between the press head (9) and the rake head (2). The inventive device is mainly characterized in that the press head (9) is attached to the handle (1) so as to enable raked material (13) to be gripped between the press head and the rear side of the rake head (2). The press head (9) will preferably have the form of a second rake-like head which includes resilient tines (11) having prongs (12) which face towards the rear side of the first rake head (2).

UK Patent Number GB2,358,781

Inventor: Hao Hsu Shih

Issued: Aug. 8, 2001

A rake has a rod 20 rotatably engaged in a sleeve 30. Two tine heads 11,12 are provided, one secured to the sleeve 30 and one to the rod 20. Tine heads 11 and 12 are rotatable relative to each other between an open position and a folded position. One of the tine heads may be rotated relative to the other tine head by the rod 20. A spring 16 is engaged between the tine heads for biasing the tine heads 11,12 to the open position. A pole 40 and a tube 50 may further be secured to the rod 20 and the sleeve 30 respectively to extend their lengths and allow for compact storage/transport. A hand grip 44 is secured to the pole 40. The rake may be used to grip/pick up leaf debris when in the closed position.

AU Patent Number AU2003100904

Inventor: Sergio Messano

Issued: Dec. 18, 2003

A pick up rake as disclosed with a device being the mechanism of the invention two elongated handles attached to the mechanism and two rack heads attached to the handles. This tool collects and picks up leaves and debris.

While these tools may be suitable for the purposes for which they were designed, they would not be as suitable for the purposes of the present invention, as hereinafter described. The present invention provides a combination rake and shovel tool having handles of which are crossed and pivoted to one another. The rake having a straight head and prongs pointing in the direction of the shovel scoop and being a leaf type rake. The shovel is similar to a snow shovel. The rake and shovel close together to pick up leaves and debris. The device may also be singularly used as a shovel or rake or in combination, additionally the present invention can be placed in a standing position when not in use.

SUMMARY OF THE PRESENT INVENTION

A primary object of the present invention is to provide a combination rake and shovel tool having handles of which are crossed and pivoted to one another.

Another object of the present invention is to provide a combination rake and shovel tool that the rake has a straight head and prongs pointing in the direction of the shovel scoop and being a leaf type rake.

Yet another object of the present invention is to provide a combination rake and shovel tool that the shovel is similar to a snow shovel.

Still yet another object of the present invention is to provide a combination rake and shovel tool that the rake and shovel will close together to pick up leaves and debris.

Another object of the present invention is to provide a combination rake and shovel tool that the device may also be singularly used as a shovel or rake or in combination Yet another object of the present invention is to provide a combination rake and shovel tool that the present invention can be placed in a standing position when not in use.

Additional objects of the present invention will appear as the description proceeds.

The present invention overcomes the shortcomings of the prior art by providing a combination rake and shovel tool having handles of which are crossed and pivoted to one another. The rake having a straight head and prongs pointing in the direction of the shovel scoop and being a leaf type rake. The shovel is similar to a snow shovel. The rake and shovel close together to pick up leaves and debris. The device may also be singularly used as a shovel or rake or in combination, additionally the present invention can be placed in a standing position when not in use.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Combination Rake and Shovel Device of the present invention. With regard to the reference numerals used, the following numbering is used throughout the various drawing figures.

10 Combination Rake and Shovel Device of the present invention
12 shovel member
14 shovel handle
16 rake member
18 rake handle
20 tine of 16
22 prong of 20
24 leaves/debris
26 user
28 pivot point
30 offset "A"
32 ground
34 offset "B"
40 pivot point fastener assembly
42 bolt
44 nut
46 washer
48 refuse container

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Figure 1:
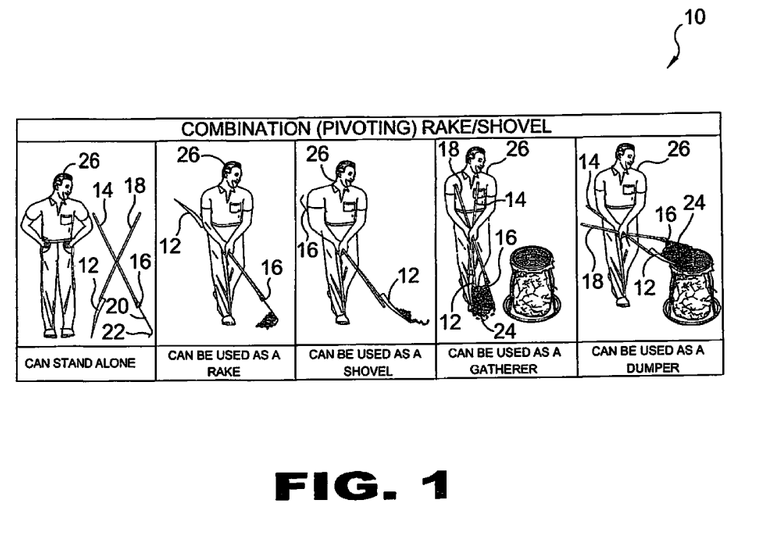
FIG. 1 is an illustrated chart of the uses of the present invention.

FIG. 1 is an illustrated chart of the uses of the present invention 10. The present invention is a combination rake and shovel tool 10 having a shovel member 12 with a handle 14 and a rake member 16 with a handle 18 wherein both handles 14,18 are fastened and pivotal to one another. The rake 16 has a plurality of resilient tines 20 emanating therefrom with each tine 20 having a prong 22 on the distal end thereof projecting in the direction of the shovel member 12 which is configured similar to a snow shovel. The rake 16 and shovel 12 work in scissor-like fashion to close together to pick up leaves 24 and debris. The user 26 may employ the rake and shovel tool 10 singularly used as a shovel or rake or in combination, additionally the present invention 10 can be placed in a standing position when not in use.

Figure 2:
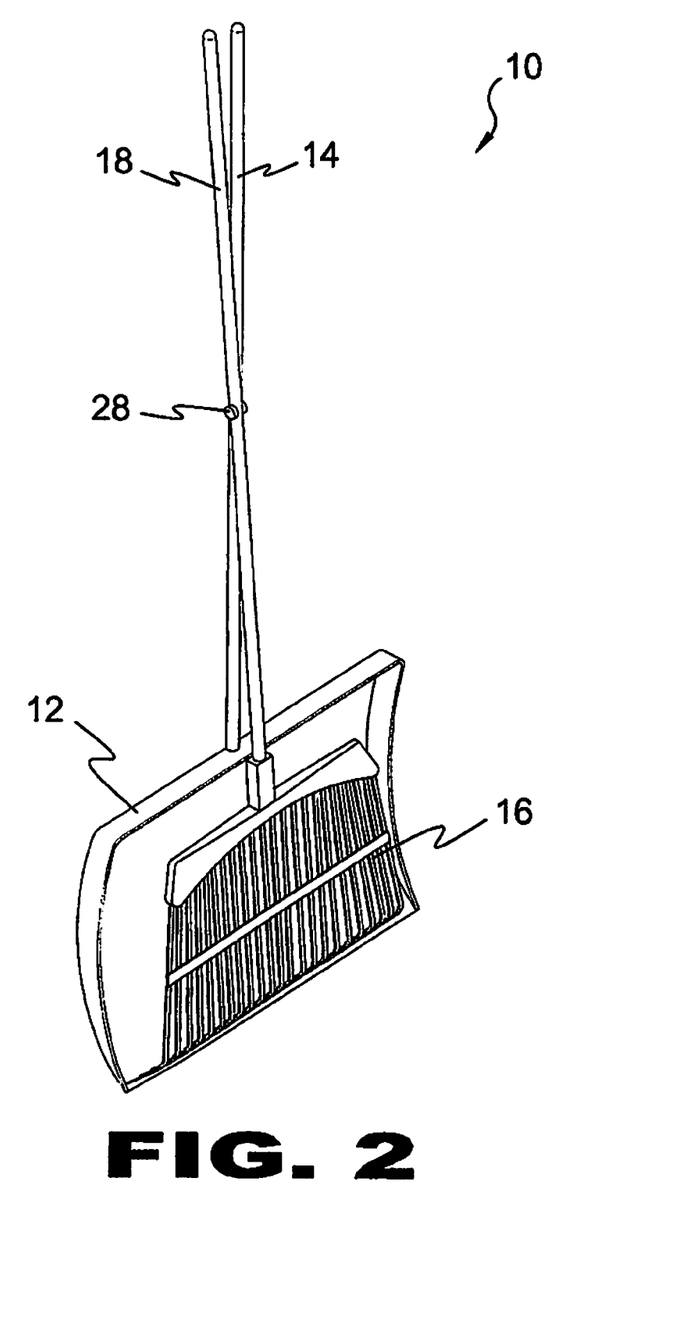
FIG. 2 is a perspective view of the present invention.

FIG. 2 is a perspective view of the present invention 10. Shown is the combination rake and shovel tool 10 having a rake 16 and a shovel 12 with handles 18,14 which are crossed and pivoted to one another at a pivot point 28. The device is used for raking and picking up and placing leaves, twigs, grass, branches, dirt, acorns and other debris into a garbage bag or trash can. The rake 16 has prongs pointing in the direction of the shovel 12 so that the rake 16 can gather debris when in raking position, but can also hold debris against the shovel 14 when in placement or transport position.

Figure 3:
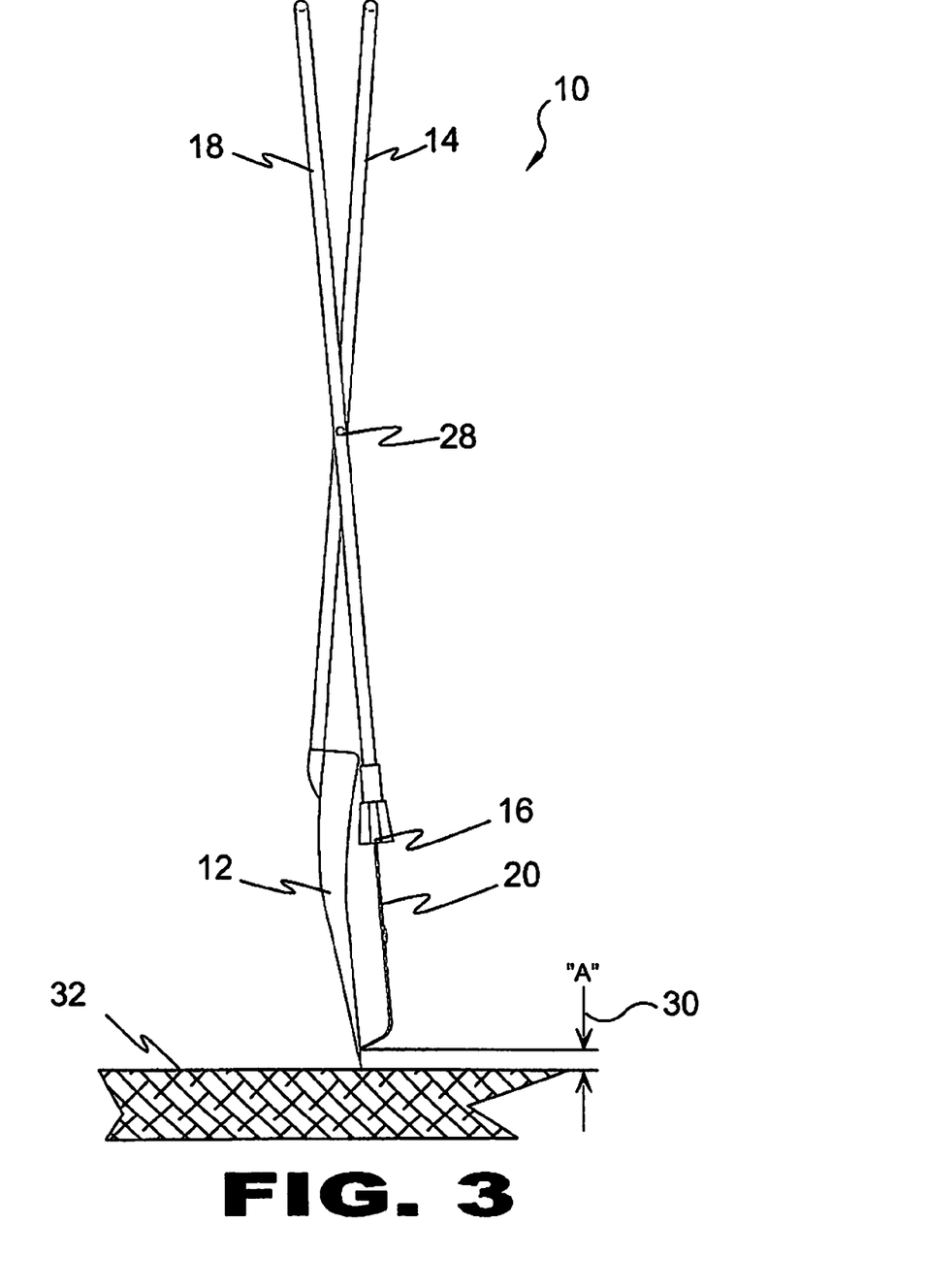
FIG. 3 is a side view of the present invention.

FIG. 3 is a side view of the present invention 10. Shown is a side view of the combination rake and shovel tool 10 having a shovel 12 ideal for scooping leaves, a rake 16 that may be utilized for gathering and a pivot point 28 connecting the shovel handle 14 with the rake handle 18 which allows the device to perform a pinching operation whereby piles of debris or leaves may be easily grabbed and lifted into a container for disposal. Also shown is the lip of the rake having offset "A" 30 from the lip of the shovel to prevent the rake tines 20 from bending when used for grasping material from the ground 32.

Figure 4:
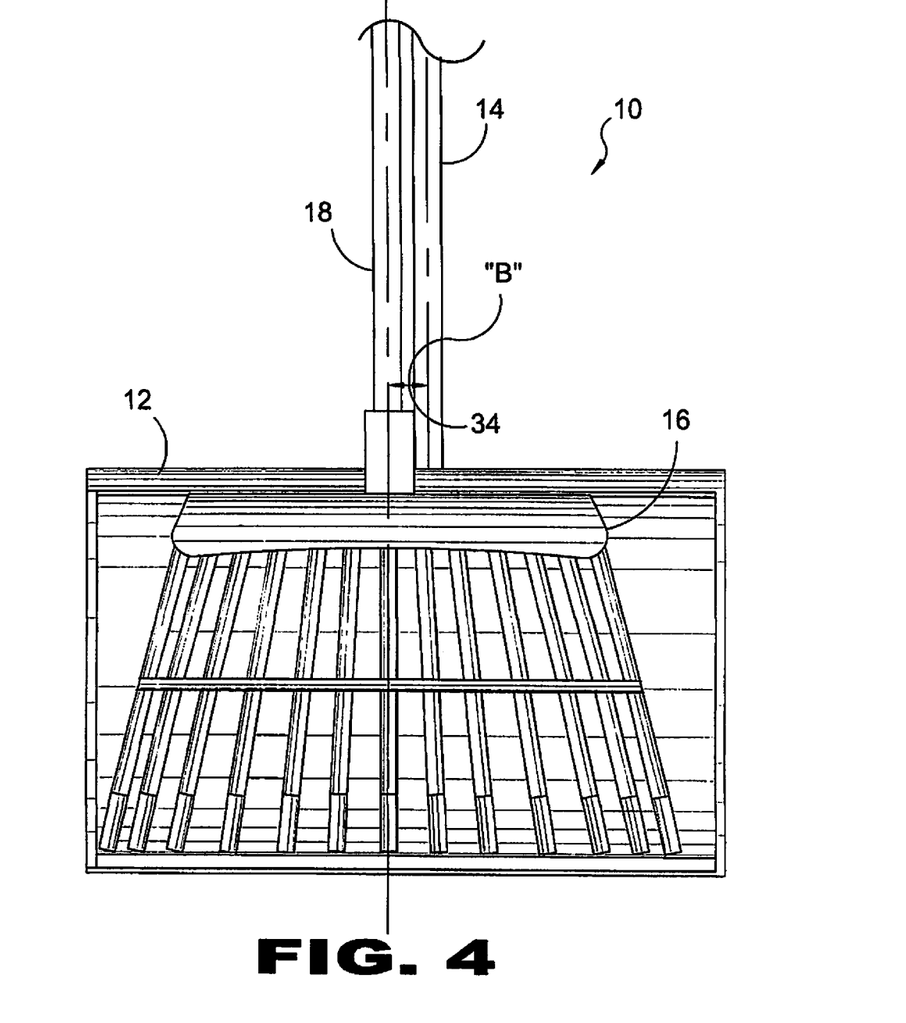
FIG. 4 is a front view of the combination rake and shovel tool.

FIG. 4 is a front view of the combination rake and shovel tool 10. Depicted is the combination tool 10 in a closed position demonstrating offset "B" 34 wherein the handle 14 of the shovel 12 is offset from its respective center so that the jaws of the combination tool are in alignment at the pivot point with the handle 18 of the rake.

Figure 5:
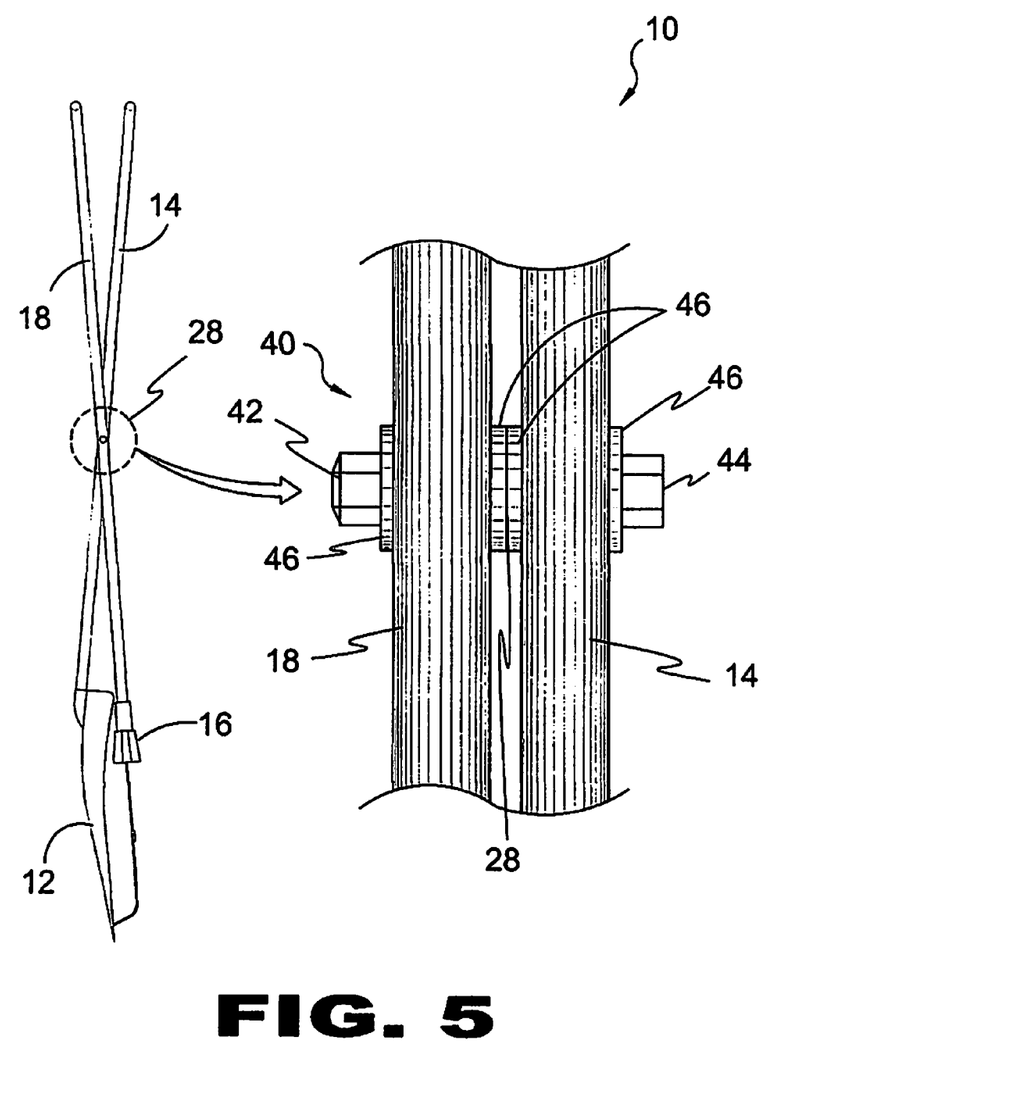
FIG. 5 is an enlarged view of the combination tool pivot point fastener.

FIG. 5 is an enlarged view of the combination tool pivot point fastener assembly 40 of the present invention 10. Shown is an enlarged view of the pivot point 28 of the combination rake and shovel tool 10 utilized to allow the handle 14 of the shovel 12 and the handle 18 of the rake 16 to pivot in relation to one another and perform a pinching effect or to hold gathered debris. The fastener assembly 40 comprises a bolt 42, a nut 44 and a plurality of washers 46.

Figure 6:
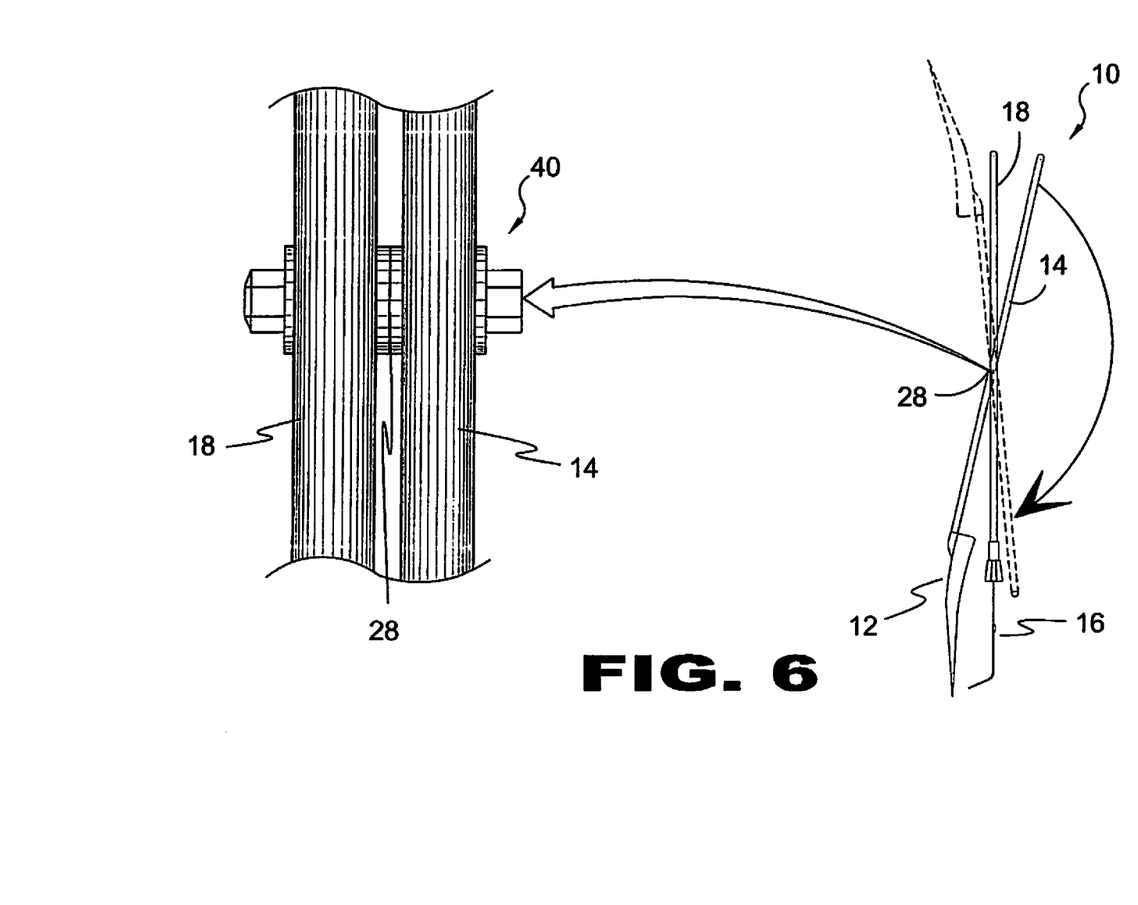
FIG. 6 is a detailed view of the present invention.

FIG. 6 is a detailed view of the pivot point faster assembly 40 of the present invention 10. Shown is a detailed view of the pivot point 28 of the combination rake and shovel tool 10 and a view of the device in pivoting motion. Additionally shown are a plurality of arrangements whereby the shovel 12 and rake 16 may be pivoted in relation to one another through the manipulation of their respective handles 14,18.

Figure 7:
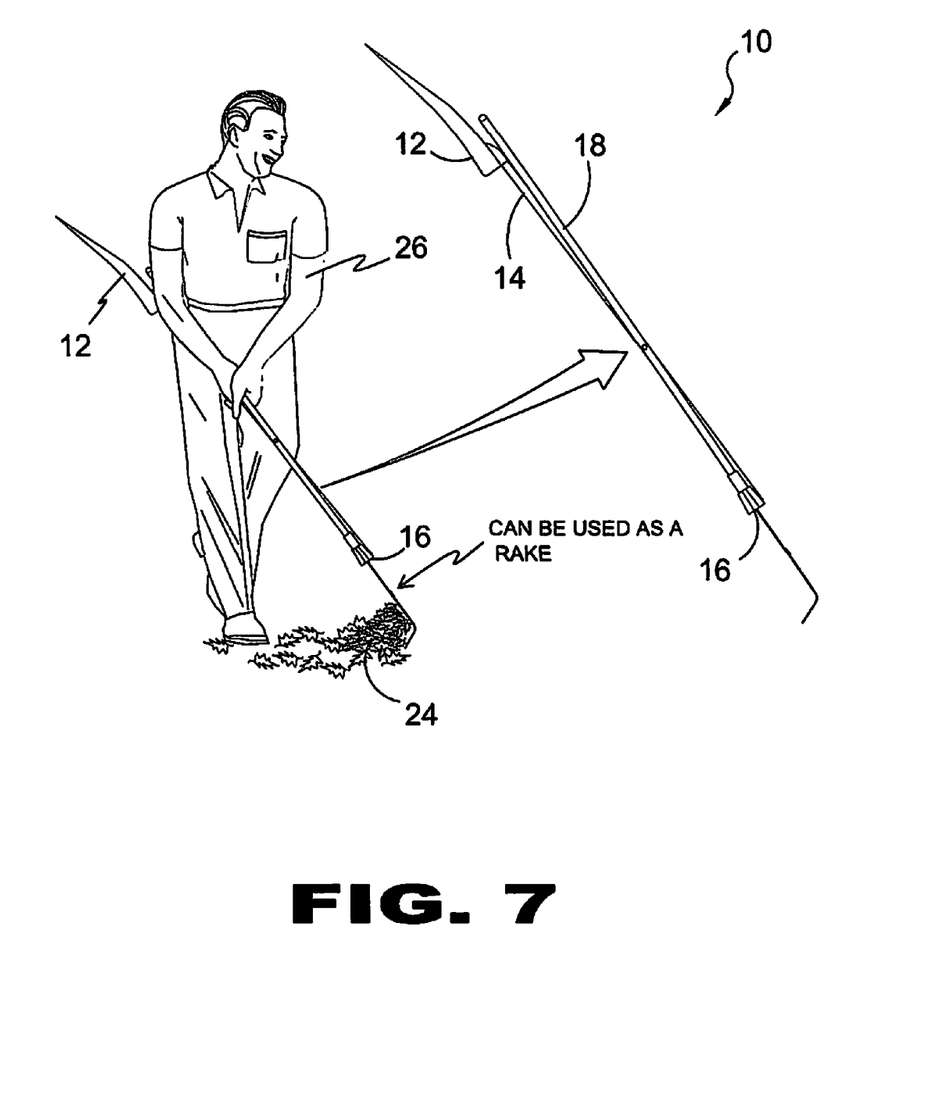
FIG. 7 is an illustrative view of the present invention in use as a rake.

FIG. 7 is an illustrative view of the present invention 10 in use as a rake 16. Shown is the combination rake and shovel tool 10 being used as a rake 16 with the shovel 12 pivoted upward and out of the way. When the present invention 10 is manipulated into this position by the user 26 through the use of the respective handles 14,18 the rake 16 operates like a typical rake 16 for gathering leaves 24, debris and the like.

Figure 8:
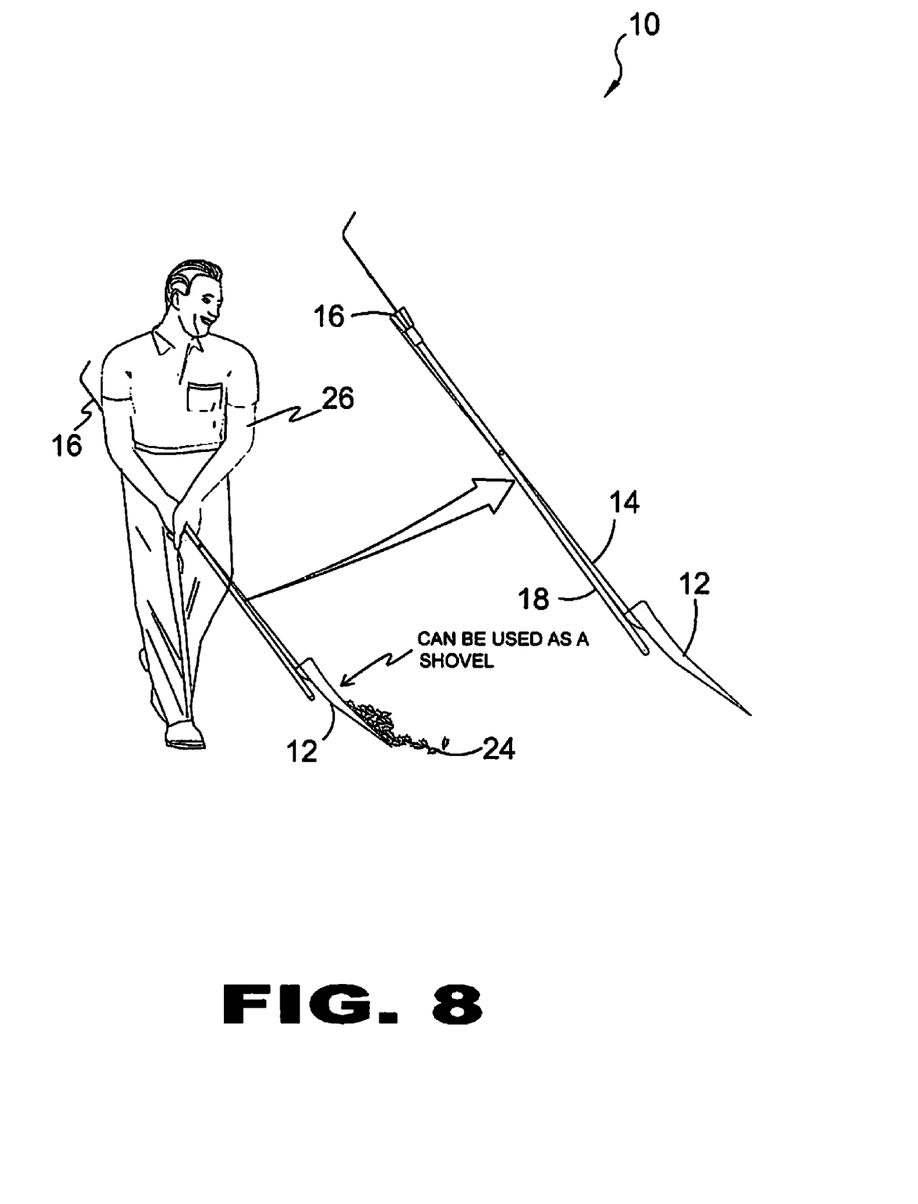
FIG. 8 is an illustrative view of the present invention in use as a shovel.

FIG. 8 is an illustrative view of the present invention 10 in use as a shovel 12. Shown is the combination rake and shovel tool 10 being used as a shovel 12 with the rake 16 pivoted upward and out of the way. When the present invention 10 is manipulated into this position by the user 26 through the use of the respective handles 14,18 the shovel 12 operates like a typical shovel 12 for scooping.

Figure 9:
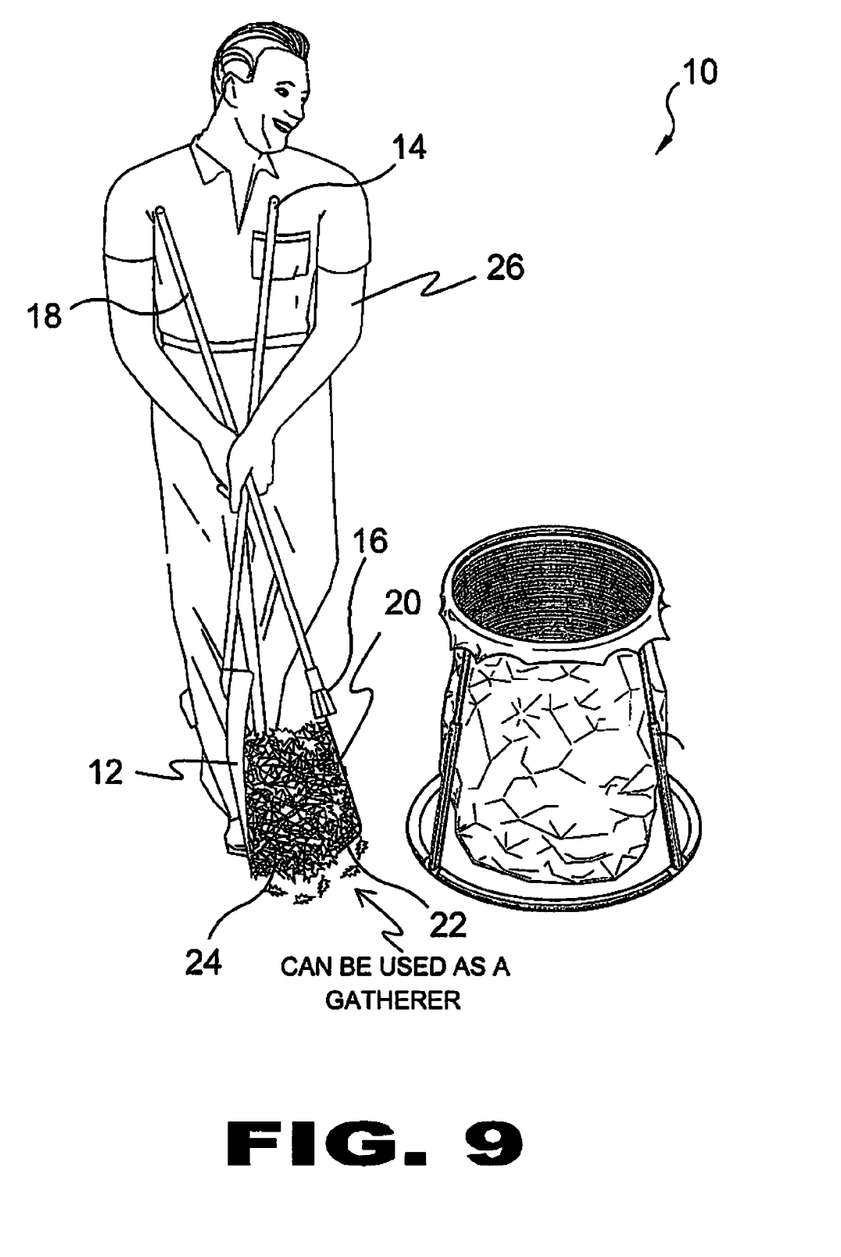
FIG. 9 is an illustrative view of the present invention in use.

FIG. 9 is an illustrative view of the present invention 10 in use. Shown is the combination rake and shovel tool 10 being used as a combination tool and having handles 14,18 which are crossed and pivoted by the user 26 to perform a pinching action between the shovel 12 and rake 16. The tines 20 of the rake 16 have prongs 22 pointing in the direction of the shovel 12 so that the rake 16 can gather debris 24 when in raking position, but can also hold debris 24 against the shovel 12 when in placement or transport position.

Figure 10:
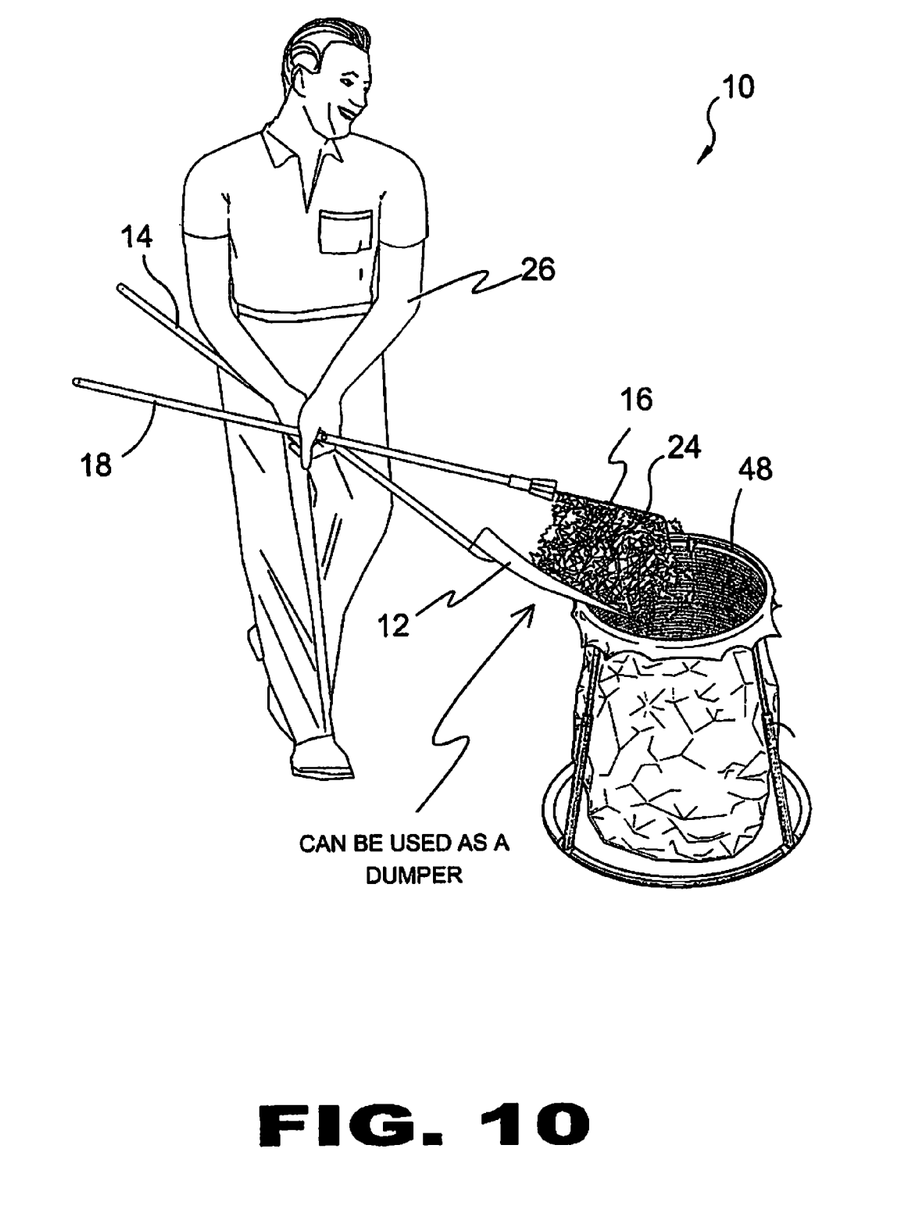
FIG. 10 is an illustrative view of the present invention in use.

FIG. 10 is an illustrative view of the present invention 10 in use. Shown is the combination rake and shovel tool 10 being with the user 26 manipulating the handles 14,18 as a device for picking up raked leaves 24 utilizing both the shovel 12 as a scooping device and the rake 16 as a retaining member for scooped debris 24 until deposited into a refuse container 48.

Figure 11:
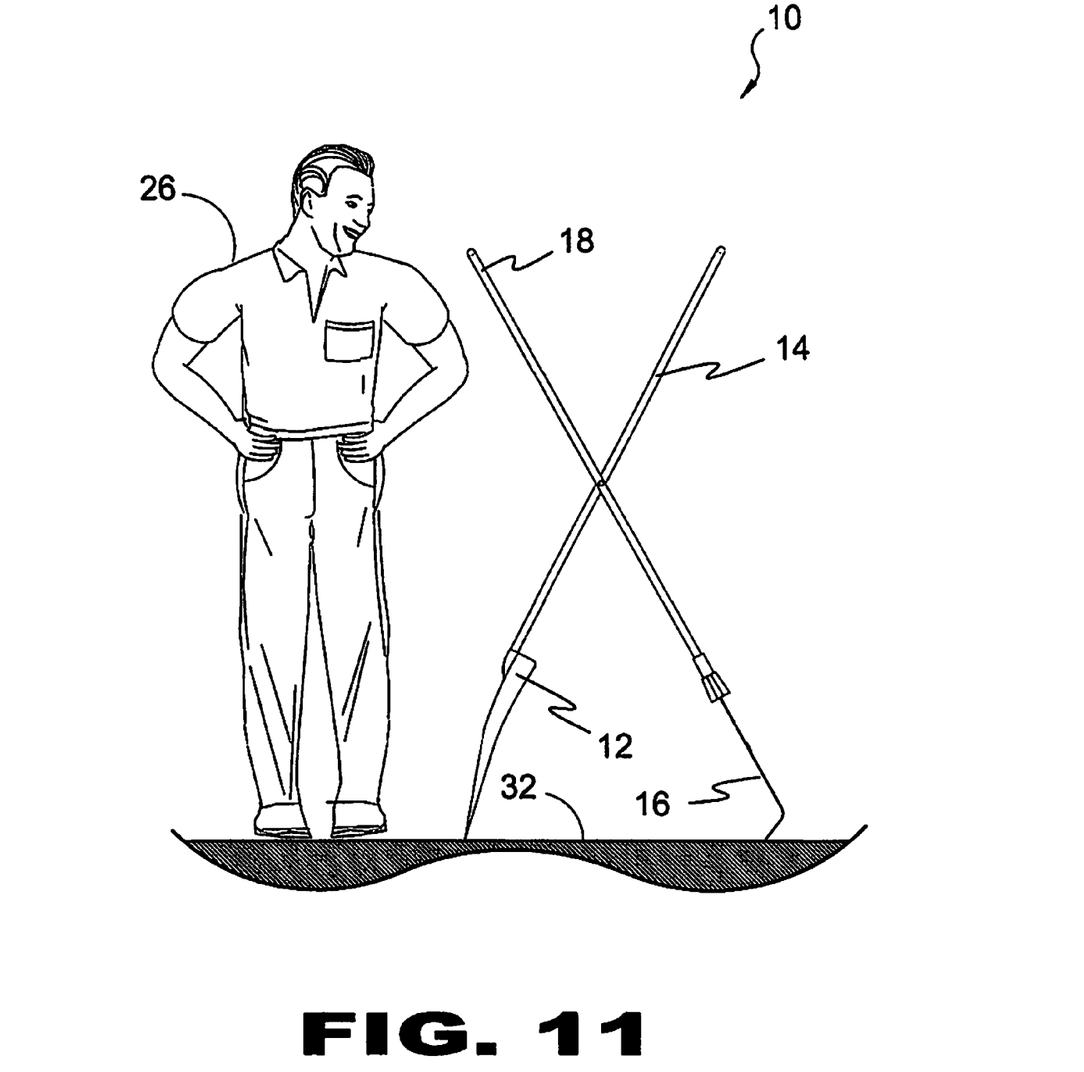
FIG. 11 is a side view of the present invention in an open position.

FIG. 11 is a side view of the present invention 10 in an open position. Shown is the combination rake and shovel tool 10 having handles 14,18 that when pivoted apart can be used to keep the present invention 10 upright and standing freely on the edges of the rake 16 and shovel 12. This improve efficiency when working as the user 26 doesn't have to continuously keep having to bend over to pick up the tool from the ground 32

Figure 12:
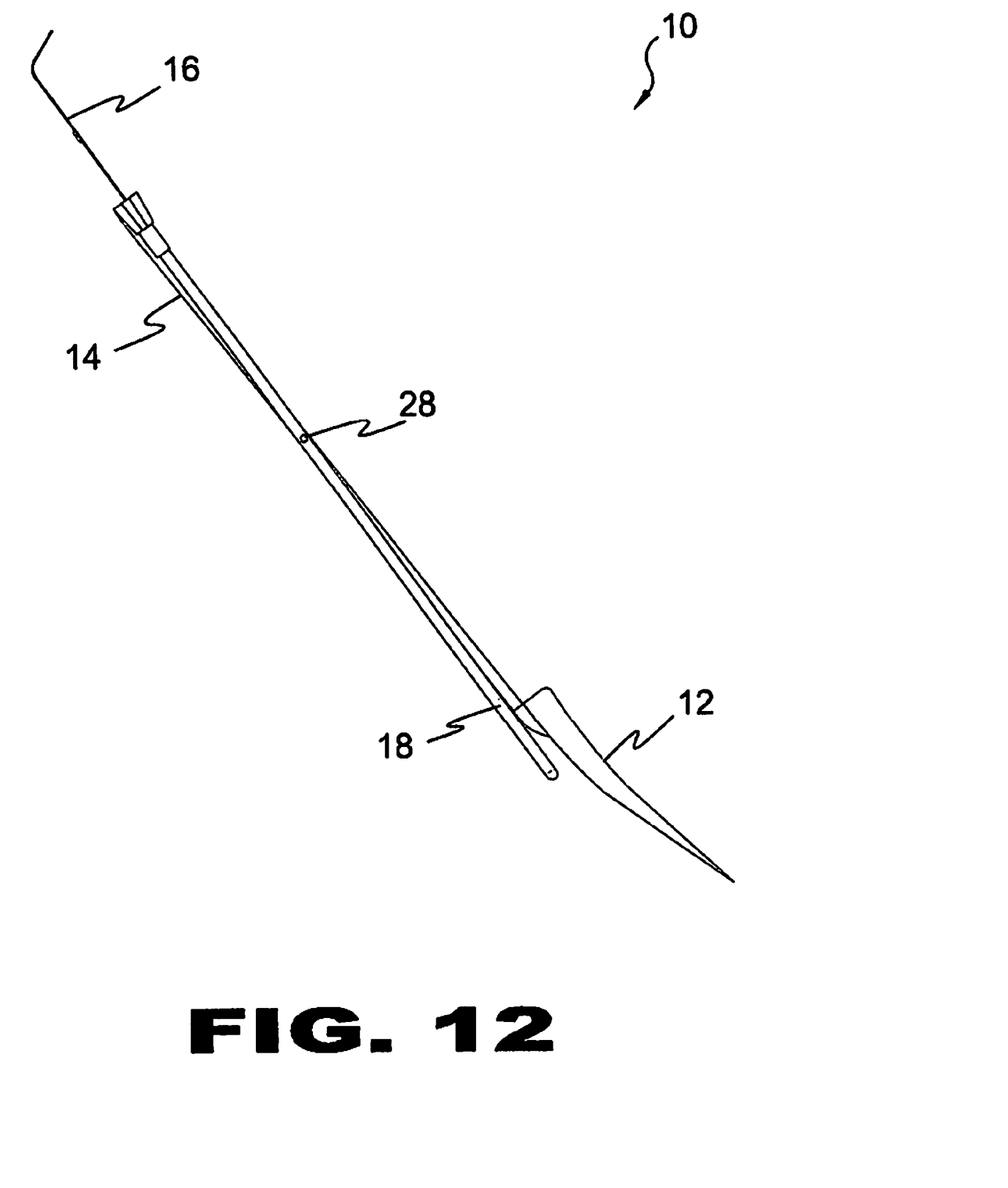
FIG. 12 is a side view of the present invention in use as a shovel.

FIG. 12 is a side view of the present invention 10 in use as a shovel 12. Shown is the combination rake and shovel tool 10 being used as a shovel 12 whereby the rake 16 is pivoted to the back and out of the way of the user when the user wishes to utilize only the shoveling feature of the device. The handles 14,18 are manipulated around the pivot point 28 to achieve the various configurations.

Figure 13:
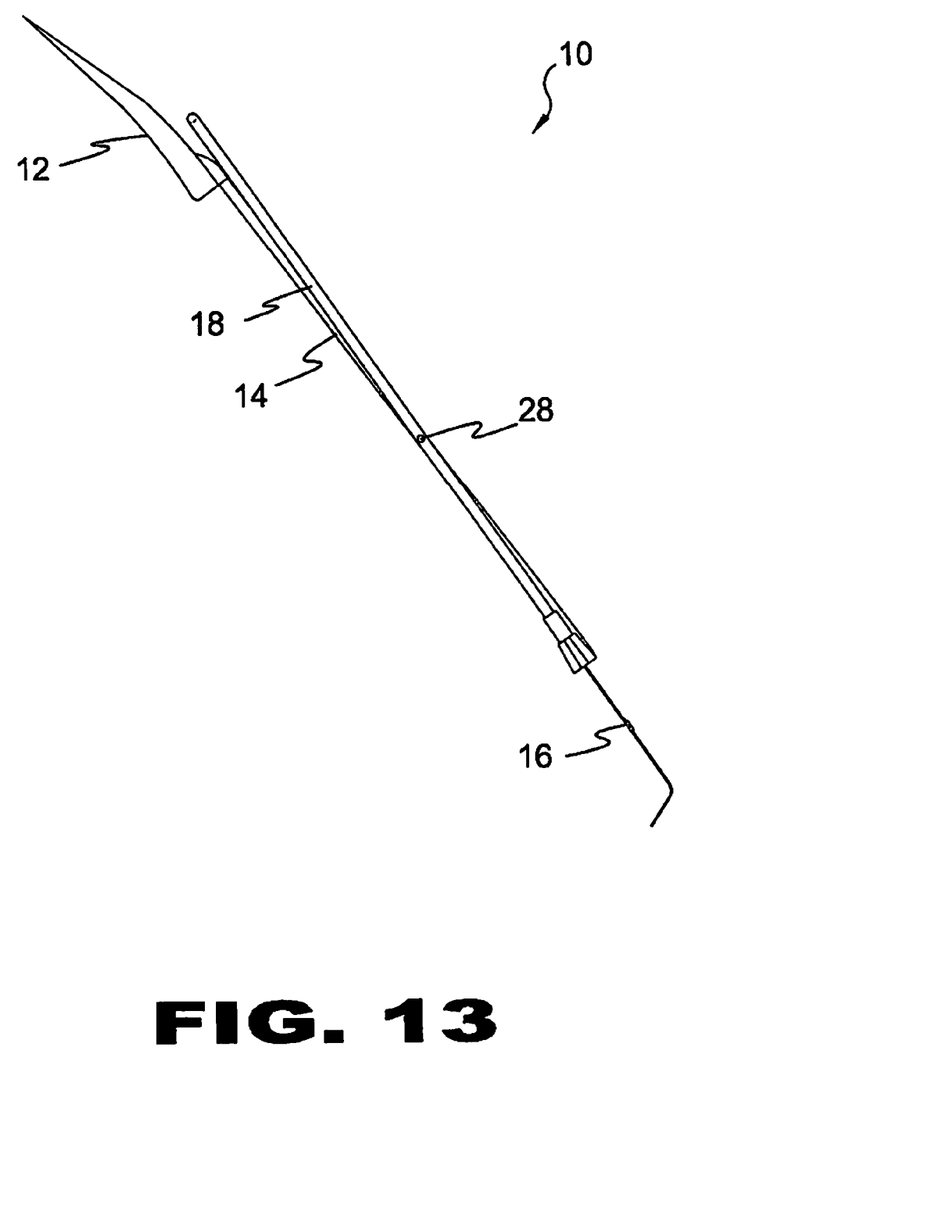
FIG. 13 is a side view of the present invention in use as a rake.

FIG. 13 is a side view of the present invention 10 in use as a rake 16 Shown is the combination rake and shovel tool 10 being used as a rake 16 whereby the shovel 12 is pivoted to the back and out of the way of the user when the user wishes to utilize only the raking feature of the device. The handles 14,18 are manipulated around the pivot point 28 to achieve the various configurations.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by Letters Patent is set forth in the appended claims:

1. A combination rake and shovel device comprising:
    a) a shovel having a handle extending therefrom;
    b) a rake having a handle extending therefrom;
    c) a pivoting means of connecting said rake and said shovel at a medial point of their respective handles;
    d) said pivoting means comprising a bolt interconnecting said rake and shovel handles allowing said handles to be rotatable between a first position wherein said rake and shovel are usable together to grasp material therebetween on a ground surface and a second position rotated substantially 180 degrees from said first position whereby the rake is at one end of said device and the shovel is at an opposite end of said device so that said device can be used as either a rake or a shovel depending on how the device is being held, while said handles are not detached from each other, and
    e) said pivoting means being located on said handles so that when said handles are in said first position a distal edge of said shovel extends beyond distal ends of tines of said rake to prevent said tines from bending when said device is used for grasping material on the ground surface, all of the distal ends of said tines bending adjacent said distal ends thereof only toward said shovel.

2. The combination rake and shovel device recited in claim 1, wherein said bolt has a plurality of washers and a nut for securement to said bolt.

3. The combination rake and shovel device recited in claim 2, wherein said shovel handle is offset from center of said shovel.

4. The combination rake and shovel device recited in claim 3, wherein pivoting, scissor-like manipulation of said shovel handle and said rake handle enable said rake and shovel device to perform a plurality of functions.

5. The combination rake and shovel device recited in claim 4, wherein said functions include:
    a) the ability to stand upright without assistance when not in use:
    b) the ability to be used strictly as a rake;
    c) the ability to be used strictly as a shovel;
    d) the ability to be used as a grasper; and
    e) the ability to be used as a dumper.

6. The combination rake and shovel device recited in claim 5, wherein said rake handle is rotatable on said pivot point to position it in a substantially parallel relation with said shovel handle with said rake extending in one direction for use as a rake and said shovel extending in an opposite direction for use as a shovel while said handles remain attached.

7. A combination rake and shovel device consisting of:
    a) a shovel having a handle extending therefrom;
    b) a rake having a handle extending therefrom;
    c) a pivoting means of connecting said rake and said shovel at a medial point of their respective handles;
    d) said pivoting means comprising a bolt interconnecting said rake and shovel handles allowing said handles to be rotatable between a first position wherein said rake and shovel are usable together to grasp material therebetween on a ground surface and a second position rotated substantially 180 degrees from said first position whereby the rake is at one end of said device and the shovel is at an opposite end of said device so that said device can be used as either a rake or a shovel depending on how the device is being held, while said handles are not detached from each other; and e) said pivoting means being located on said handles so that when said handles are in said first position a distal edge of said shovel extends beyond distal ends of tines of said rake to prevent said tines from bending when said device is used for grasping material on the ground surface, all of the distal ends of said tines bending adjacent said distal ends thereof only toward said shovel.

* * * * *